Aug. 10, 1954  R. W. BROWN  2,685,964
ENGINE CONTAINER WITH EXTERNAL RESILIENT SHOCK ABSORBERS
Filed Jan. 3, 1950  6 Sheets-Sheet 1
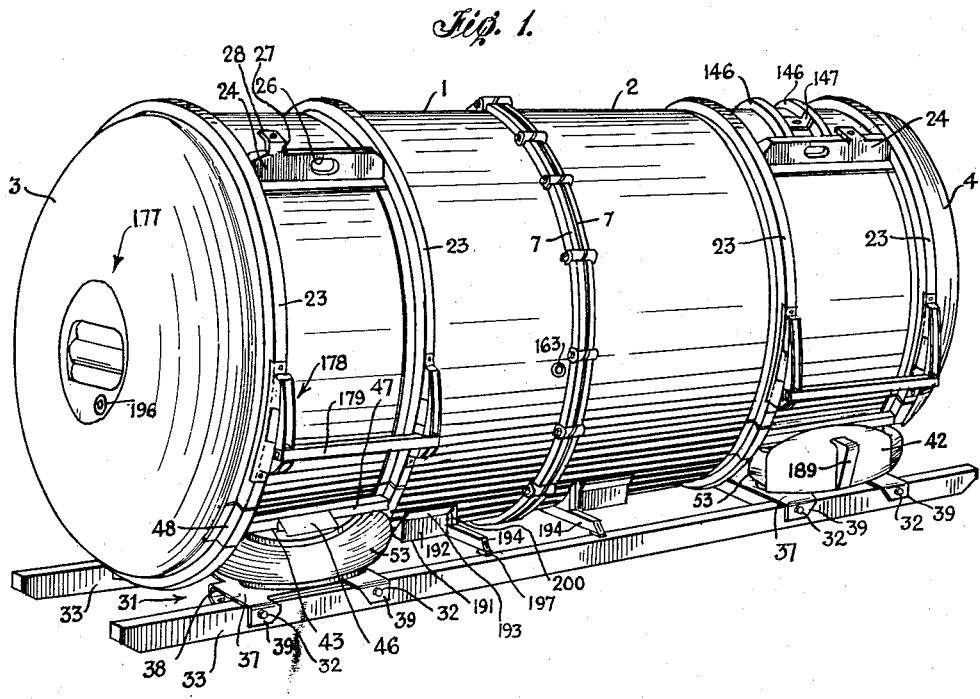
Fig. 1.
Fig. 6.
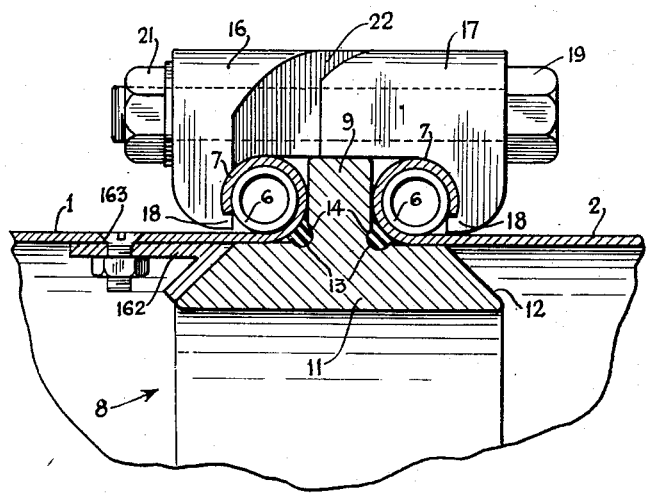
Inventor
Roy W. Brown
By Ely & Frye
Attorneys Aug. 10, 1954 R. W. BROWN 2,685,964
ENGINE CONTAINER WITH EXTERNAL RESILIENT SHOCK ABSORBERS
Filed Jan. 3, 1950 6 Sheets-Sheet 2
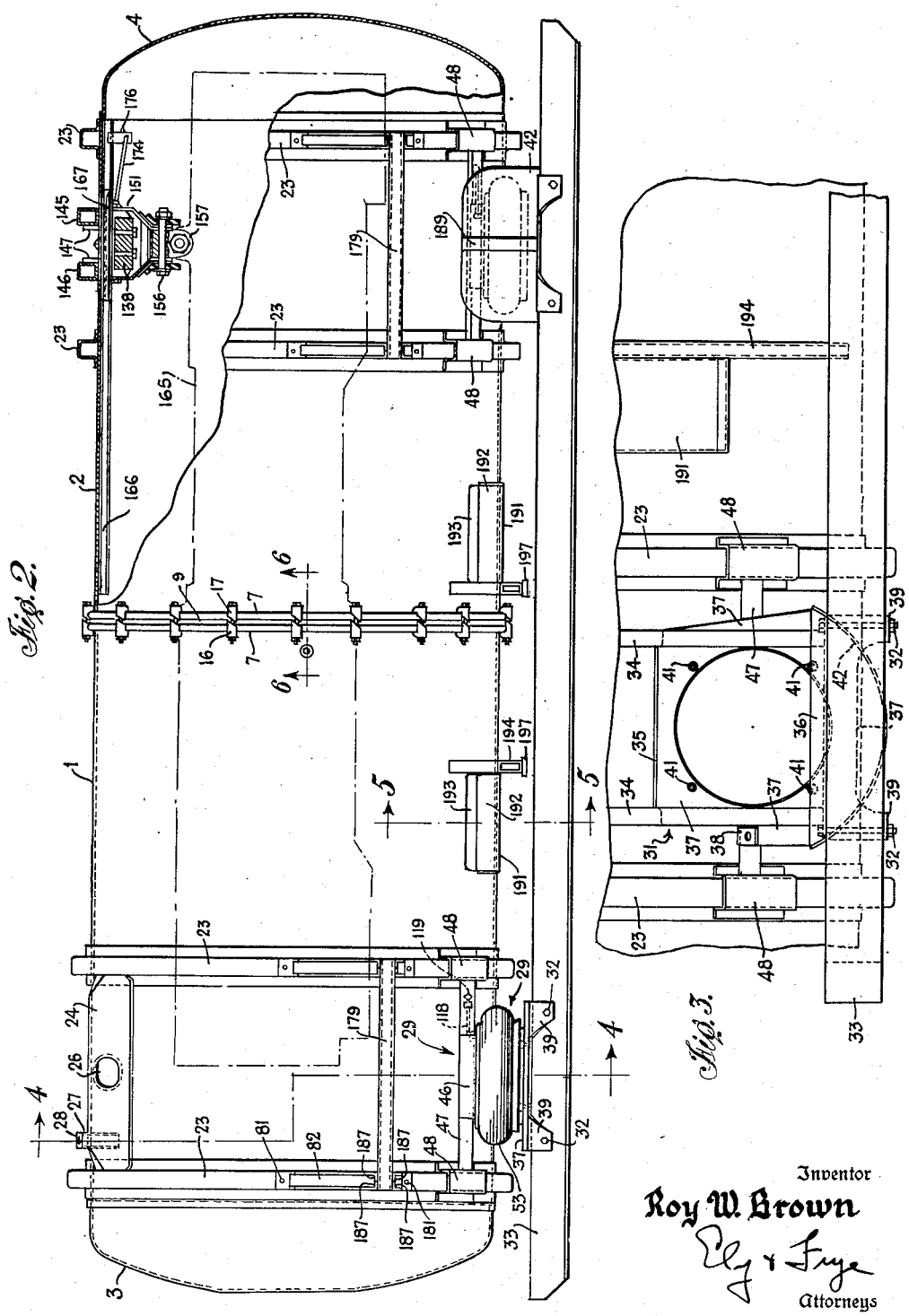
Inventor
Roy W. Brown
Ely & Frye
Attorneys Aug. 10, 1954 R. W. BROWN 2,685,964
ENGINE CONTAINER WITH EXTERNAL RESILIENT SHOCK ABSORBERS
Filed Jan. 3, 1950 6 Sheets-Sheet 3
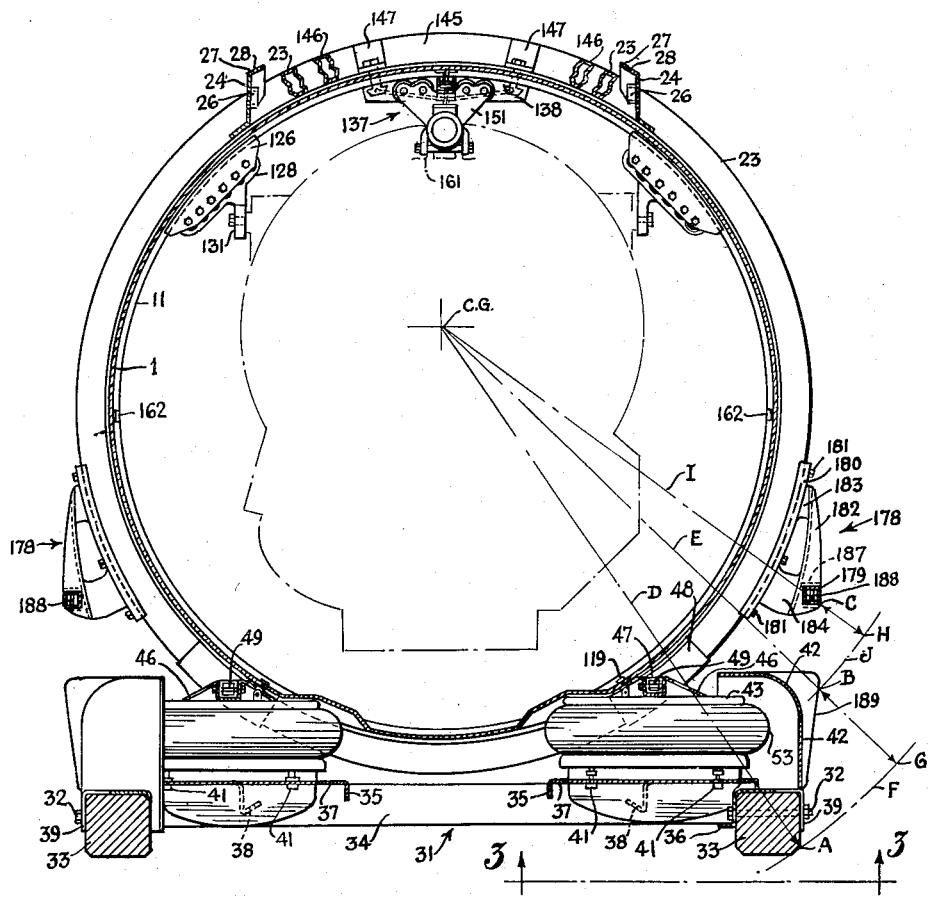
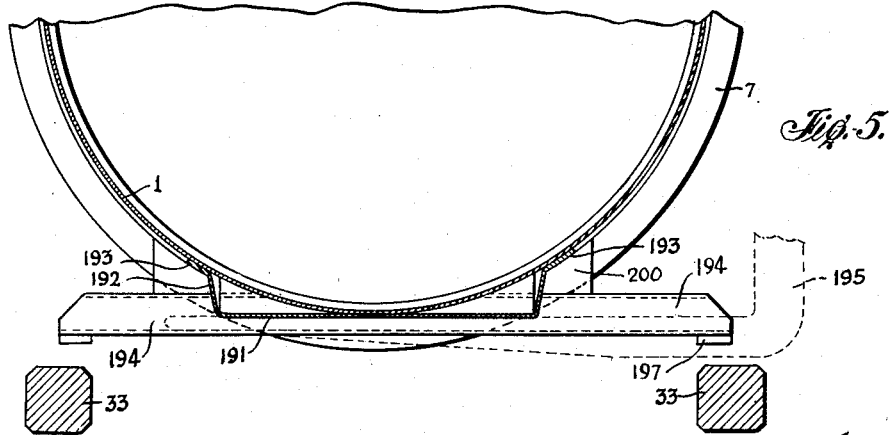
Inventor
Roy W. Brown
Ely & Frye
Attorneys

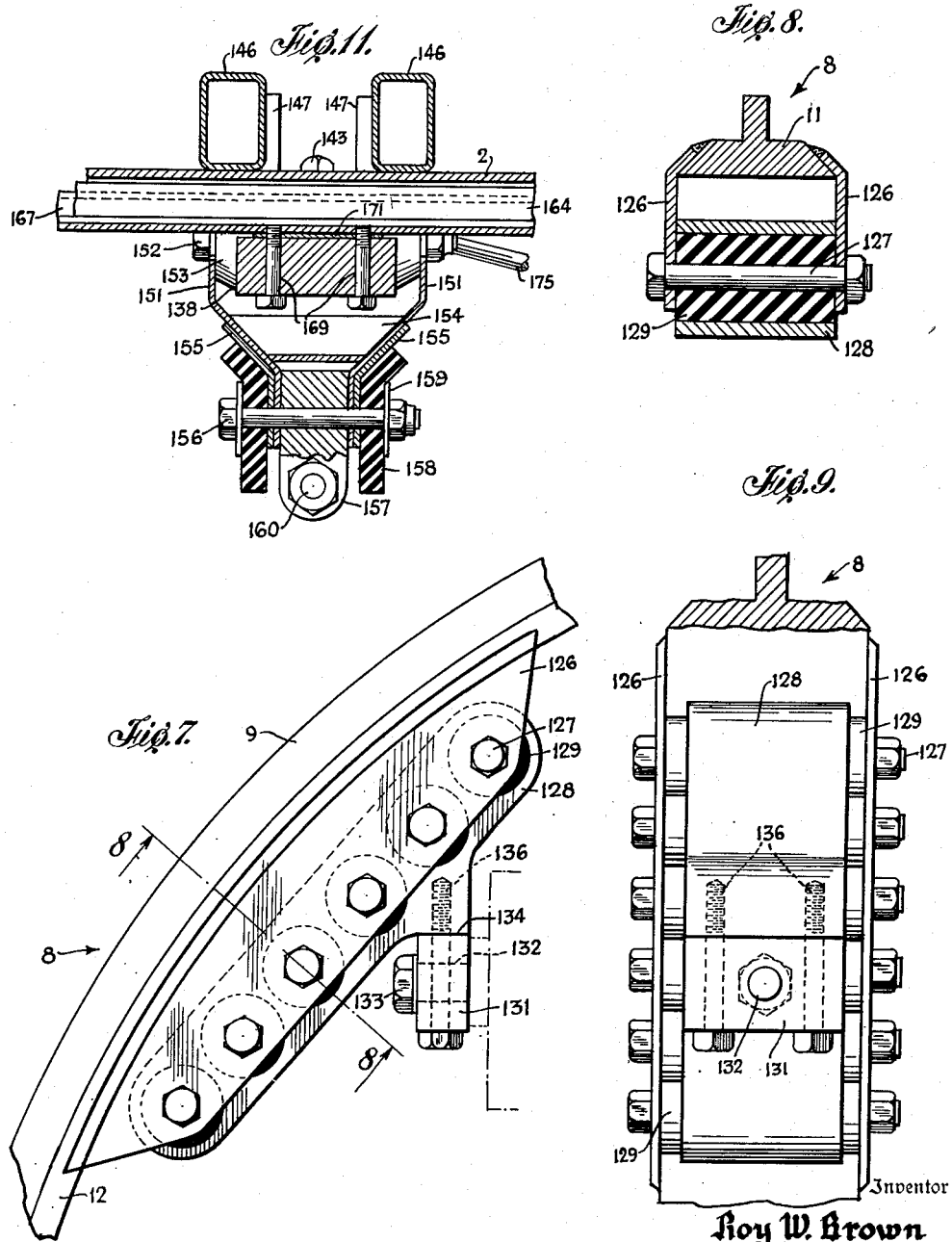

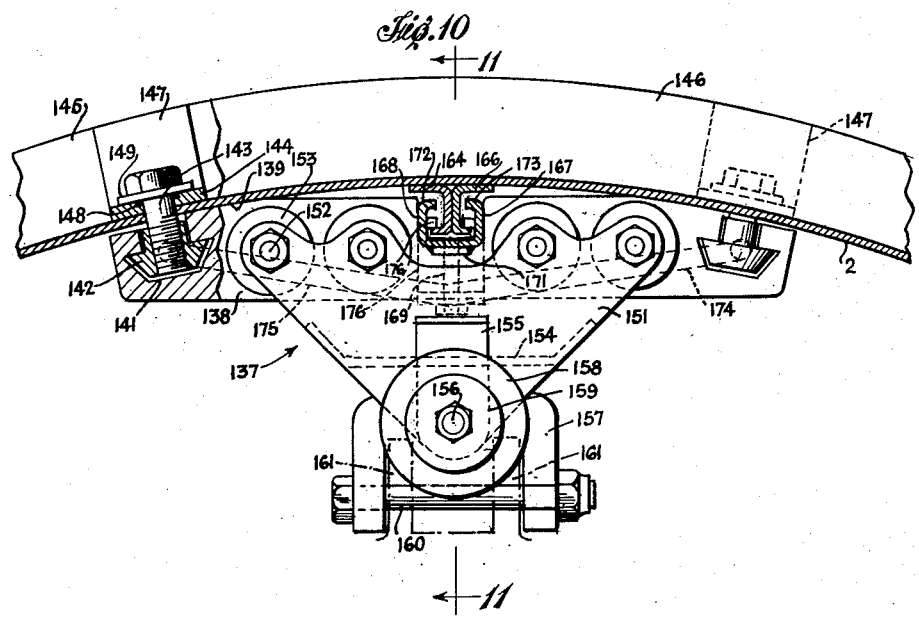
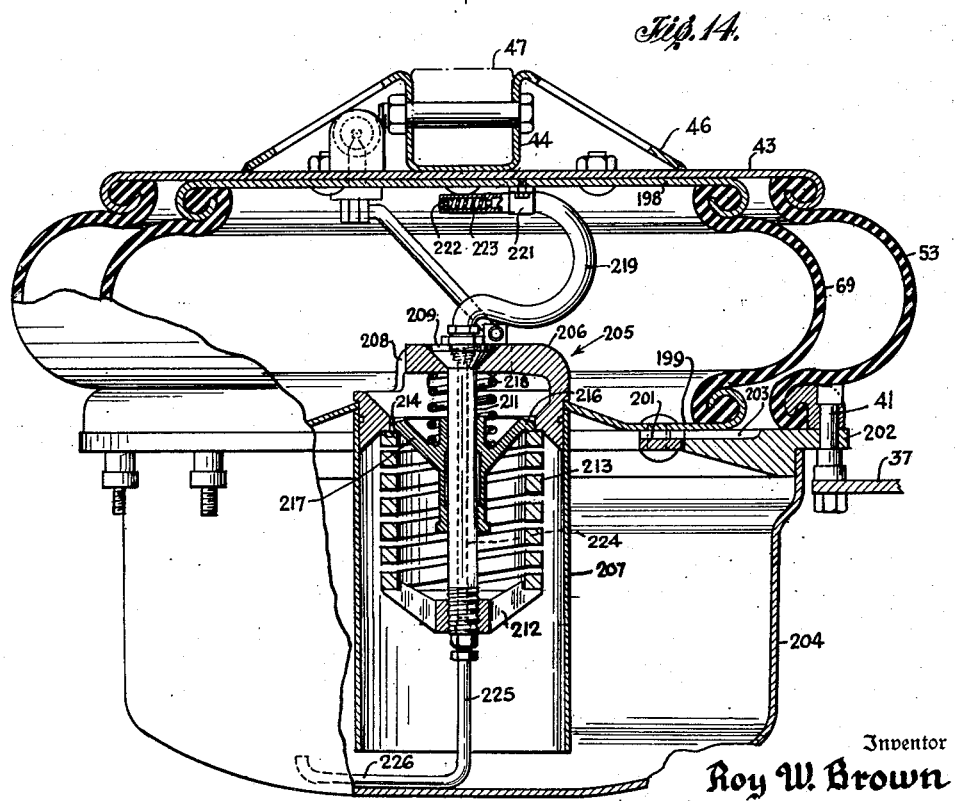

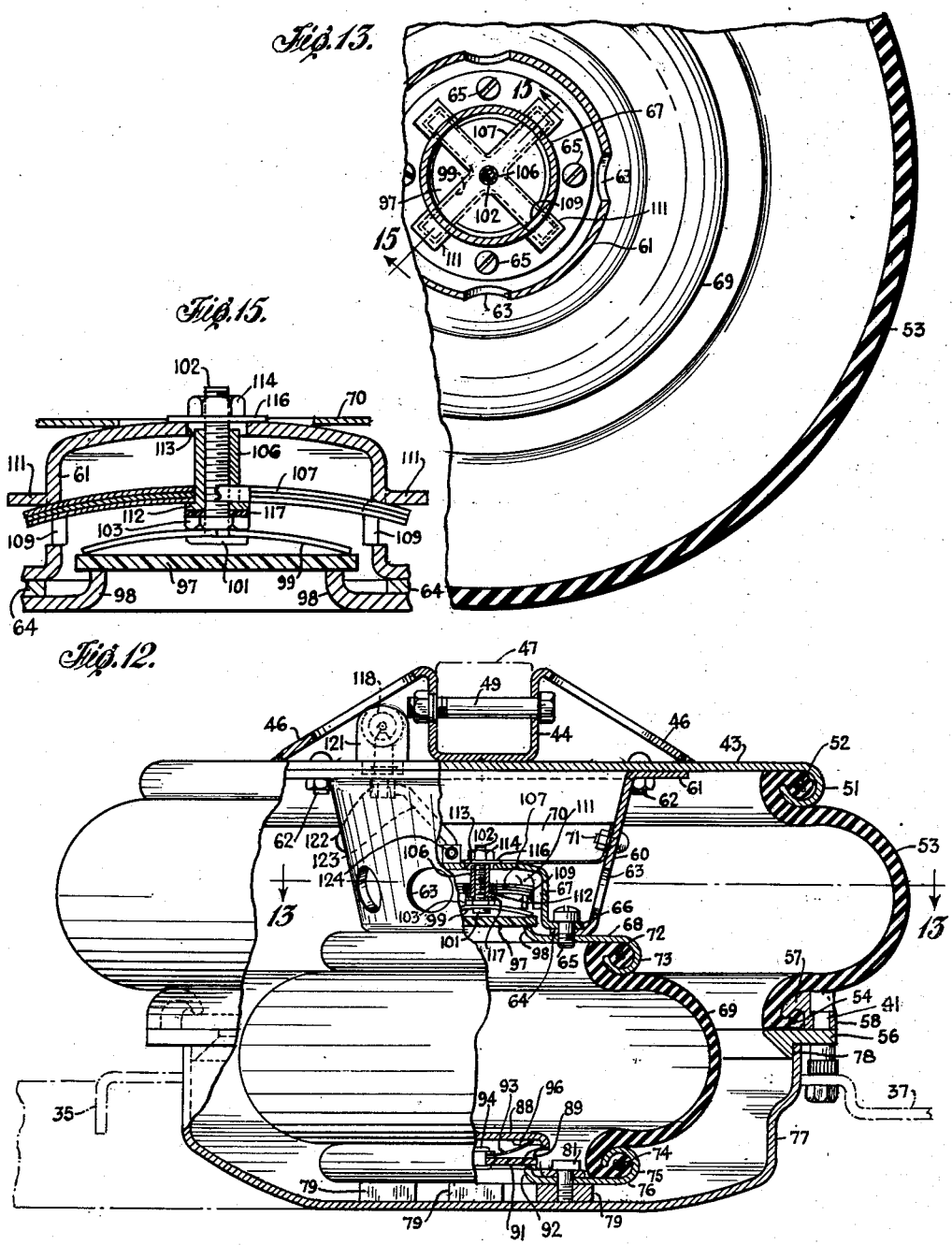

Patented Aug. 10, 1954

2,685,964

UNITED STATES PATENT OFFICE 2,685,964

ENGINE CONTAINER WITH EXTERNAL RESILIENT SHOCK ABSORBERS

Roy W. Brown, Akron, Ohio, assignor to The Firestone Tire & Rubber Company, Akron, Ohio, a corporation of Ohio Application January 3, 1950, Serial No. 136,565

14 Claims. (Cl. 206—46)

This invention relates to improvements in containers particularly adapted for the storage and transportation of aircraft engines.

The primary object of this invention resides in the provision of a container employing improved shock cushioning suspension devices operable on both a hydraulic and a pneumatic principle, both separately and in combination.

An important object of the invention is to provide an aircraft engine container of rugged design and construction sealed to the atmosphere to permit dehydration of the interior thereof, while offering protection to an engine contained therein against severe jars and jolts attendant the rough handling to which a heavy object such as an engine is liable during loading and transportation.

A specific object of the invention resides in the provision of improved means for suspending a heavy object such as jet type aircraft engines from the walls of a protective container, and to mount the suspending container on external springs.

Still another object resides in the provision of improved shock absorbing units of the hydraulic-pneumatic type, with particular reference to improvements in the metering valve assemblies employed therein, and including self-priming features.

A still further object resides in the provision of an improved skid-mounted container adapted for easy handling through the use of palletizing trucks and adapted for palletizing in a manner to relieve the weight of the contents of the container from the bellows-type shock absorbers during palletized storage.

A further object is to provide improved means for the cushion mounting of a container on a skid assembly to provide maximum cushioning effect against jars and jolts incident to overturns and drops while retaining the cushioning displacement at a minimum.

Another object is to provide for ready stacking of containers.

Other objects and advantages are generally to improve and simplify engine containers, and still further objects will become apparent to persons skilled in the art upon examination of the drawings, the specification, and the claims appended hereto.

In the drawings, in which like parts are identified by the same reference numerals, Fig. 1 is a view in perspective of the engine container assembly, Fig. 2 is a side elevation of the container, partially broken away to show interior details, Fig. 3 is a partial bottom view of one side of the container, at one end thereof, Fig. 4 is a sectional view taken along the line 4—4 of Fig. 2, Fig. 5 is a sectional view taken along the line 5—5 of Fig. 2, Fig. 6 is an enlarged sectional view taken along the line 6—6 of Fig. 2, Fig. 7 is a fragmentary view, enlarged, of a suspending unit in Fig. 4, Fig. 8 is a sectional view taken on the line 8—8 of Fig. 7, Fig. 9 is a view of the unit shown in Fig. 7, taken from the right of that figure.

Fig. 10 is a fragmentary view, enlarged, of the top suspending unit in Fig. 4,

Fig. 11 is a sectional view taken on the line 11—11 of Fig. 10,

Fig. 12 is a side view in partial axial section of one form of air-oil bellows,

Fig. 13 is a partial view taken on the line 13—13 of Fig. 12,

Fig. 14 is a view in partial axial section of another form of air-oil bellows, and Fig. 15 is an enlarged sectional view of the upper valve of Fig. 13.

My co-pending application, Serial No. 125,143, filed October 28, 1949, illustrates an engine container consisting of a metal housing, similar to the housing herein illustrated and described, with intercommunicating, air-hydraulic mounting means, disposed radially interiorly of the container for the cushioned support of an aircraft engine suspended therein. While the principal cushioning means of the present invention are located externally of the housing for the support thereof on a skid assembly and are not intercommunicating, and the containers therefore differ in their principle of operation, certain novel features, such as the means for sealing the housing sections and the accessory chamber provided, are common to both inventions and are shown herein merely for purposes of illustration, being claimed in the previously filed application.

For the purpose of clarifying the description, the words "engine container" or "container" will be used herein to mean the complete assembly as shown in Fig. 1, while the word "housing" will be employed to describe the cylindrical type metallic casing or drum, separately from the skid assembly or the cushioning unit.

The housing is cylindrical in form and comprises two tubular sections 1, 2 with domed end closures 3, 4 secured to the respective sections in air-tight relation, as by welding. The sections 1, 2 have open faces on their ends opposite the domed closures, the open faces being adapted for registry and securement by a coupling means, shown in detail in Fig. 6, to form the closed housing.

The open ends of sections 1, 2 are each rolled about tubular reinforcing members 6 into a hollow rim 7 extending for about 300° of arc, so as to terminate short of closure upon the outer walls of the housing sections. The jointure of rims 7 is given solid support by a T-ring 8, the leg 9 of which extends radially outwardly of the housing, interposed between rims 7, and the cross arm 11 of which abuts the interior walls of sections 1 and 2. The cross arm 11 has beveled edges 12, to facilitate registration of the rims when the sections are drawn together onto the T-ring, and annular recesses 13, semi-circular in section, are provided at the meeting corners of arm 9 and arm 11 to accommodate O-rings 14. The relative dimensions of the parts are such that when O-rings 14 are deformed sufficiently to provide hermetic sealing at the coupling, the T-rims 7 make contact with the walls of the T-ring and obviate any carrying of the load by the O-rings. The assembly of sections 1 and 2 on the T-ring is secured in locked relation by opposed lugs 16, 17, engaging under the free edges of rims 7 by means of hook portions 18, and drawn together by bolts 19 and nuts 21. Bending of bolts 19 is avoided by the contact of lugs 16, 17 with the outer surface of leg 9 of the T-ring, and this contact is made possible over a considerable range of relative motion of the lugs by the provision of complementary slant surfaces 22 on the lugs.

In order to minimize weight in structures of the size necessary for accommodating the power plants for modern aircraft, the wall thickness of units such as housing sections 1 and 2 is kept to the lowest practical minimum and the walls are given peripheral reinforcement by hollow bands 23, of generally U-form cross-section, welded to the exterior of the housing sections at suitably spaced locations.

The bands 23 also serve as regions of anchorage for other units of the container, for which the thin shell of the housing would be inadequate. Thus, for hoisting purposes, a series of four plates 24, having inwardly flanged openings 26 to receive hooks, are welded to adjacent pairs of bands 23 at positions fore and aft, and on each side of the top of the housing. These plates 24 also have bent extensions 27 on their tops, bored as at 28, for bolting a second housing in stacked position, the form and location of each plate 24 and its extension 27 being suited to that of the stacking fastenings on the bottom of the container, as will appear hereinafter.

The housing rests on four bellows 29 carried in laterally adjacent pairs on cross members, shown generally at 31, located fore and aft of the housing, which latter are secured at their ends, by bolts 32, to a pair of skids 33. Each pair of cross members comprises a pair of parallel, hollow tubes 34 of rectangular cross-section, integrated at their ends by welded angle bars 36 to form a closed rectangle, the bottom flanges of the angle bars underlying the tubes 34 to lend support to the same and minimize loading at the welded connections. To provide direct support of the bellows, plates 37 are welded onto the cross member 31 at each end thereof. Since the arrangement at the two ends of member 31 is the same, only one end need be described. The inner end of plate 37 is turned down between tubes 34 as at 35 and is in end contact therewith to provide increased resistance to skewing of the plate. An outer, corner portion of the plate 37 is cut away and bent downward to provide a dependent, hooked prong 38 to be used for locking the containers in stacked relation by bolting to extensions 27 on the lifting plates 24. The plate is of a length to overlie the top of skid 33 and has dependent flanges 39 at its ends contacting the outer face of the skid 33. Flanges 39 and angle bar 36 have registering holes to receive the bolts 32, which pass through drilled holes in skid 33. It should be noted that the arrangement, with bolts passing laterally through the skids, not only provides solid anchorage of the cross member against lateral motion by means of the flanges and angle bar, but also minimizes the effects of the drilled holes on the strength of the skids since the holes are located closely adjacent the zone of neutral stresses arising when the beam is deflected from the horizontal, which is the most probable direction of deflection for the case considered.

Each bellows 29, later to be described in detail, is attached to plate 37 by means of four bolts 41. A hood 42 attached to plate 37 above the skid serves as a protective cover for the bellows.

To the top plate 43 of the bellows (see Fig. 12) is welded a channel 44, extending generally along a diameter of the plate, and the channel is braced along a line perpendicular to this diameter by means of sloping flanges 46, also welded to the plate at their extremities. For attachment of the bellows to the housing, the channel 44 is engaged (Fig. 2) around a tubular element 47 welded at its ends to arcuate straps 48 of U-section, which in turn are welded in place, in nested relation with an adjacent pair of reinforcing bands 23. Channel 44 is secured to tube 47 by bolts 49.

The internal structure of the bellows, in its preferred form, is seen in Fig. 12. The periphery of the top plate 43 is rolled downwardly and inwardly, as at 51, into generally toroidal form, to grip the bead 52 on the upper rim of an outer, annular, rubber diaphragm 53, arcuate in section. The lower bead 54 of diaphragm 53 is secured between the flat, upper surface of a coupling ring 56 and the inwardly hooked portion 57 of a clamping ring 58, which is secured to coupling ring 56 by bolts 41.

A cup 60, of frusto-conical form, has an outer base flange 61 which is centrally secured to the underside of top plate 43 as by bolts 62. Cup 60 has openings 63 in its slant walls and has an inward flange 64 to which are secured, by screws 65, four tongues 66 of a valve housing 67, and the upper plate 68 of an inner, rubber diaphragm 69. A cup-shaped annulus 70, secured to conical cup 60 as by bolts 71, has its inner opening contacting the valve housing 67 and serves as a baffle to deflect oil in the general direction of openings 63. Diaphragm 69 is of considerably smaller diameter than, but similar in form to, diaphragm 53 and has an upper bead 72 secured in the rolled rim 73 of plate 68. The lower bead 74 of diaphragm 69 is secured in the rolled rim 75 of a base plate 76, which, together with diaphragm 69 and upper plate 68, comprises an inner bellows.

A dished member 77 is snugly fitted around a shoulder 78 of coupling ring 56 and secured as by brazing, and forms the bottom closure of the bellows as a whole. Base plate 76 of the inner bellows is secured to the inner surface of closure 77, in spaced relation thereto, as by four blocks 79 which are welded to closure 77 and provided with threaded bores to receive screws 81.

The inner bellows is provided, at its top and bottom, respectively, with valves for circulatory, non-reciprocating flow of oil between the inner and outer bellows. The lower valve is a simple check valve of conventional design comprising a housing 88 secured to lower plate 76 by the same screws 81 which secure the lower plate to the bottom closure, and having openings 89 in its sides for passing oil. The valve proper comprises a disk 91 of any suitable material, such as pressed fiber, which seats on an upturned flange 92 defining a central opening in the base plate 76. The disk 91 is constantly urged toward closed position by a four-pronged spring 93 secured to the disk by a central rivet 94 and held against rotation by engagement of its prongs between pairs of downwardly extending ribs 96 on the inner wall of the top of housing 88.

The upper valve comprises a disk 97, similar to lower valve disk 91, which seats on an upturned flange 98 defining a central opening in upper plate 68 of the inner bellows. In the form of valve shown, the disk is a free member, of slightly less diameter than that of housing 67, and in its motion to and from seat 98 is loosely guided by the inner walls of the cylindrical housing.

The upper valve works against spring pressure in two stages. For this purpose, a light spring and a heavy spring are provided. The light spring 99, which is centrally mounted behind the head 101 of a bolt 102 and secured by means of a nut 103, comprises four radial prongs which are in contact with disk 97 at all times. A sleeve 106, received on bolt 102, passes through a central opening of a heavy, laminated spring 107 having four radial prongs. The latter pass through openings 109 in the housing 67 resulting from outwardly struck tabs 111. Spring 107 is supported on its underside by a flange 112 on sleeve 106, and in the normal, unstressed condition of the heavy spring, the prongs of spring 107 are in contact with the undersides of tabs 111. Sleeve 106, together with bolt 102, is slidable through a central opening 113, in the upper part of housing 67, and a nut 114 on bolt 102, acting through a washer 116, serves to draw up flange 112 of sleeve 106 to deflect the heavy spring 107 to pre-stress the same to any desired degree. With the desired value of pre-stressing applied to heavy spring 107, light spring 99 should also have its proper valve of prestressing, and the relative values of this pre-loading may be adjusted by means of one or more washers 117, inserted between sleeve flange 112 and nut 103.

For the purpose of carrying the static load and cushioning minor shocks, the air in the bellows is placed under pressure. While this could be done by introducing air under pressure directly into the bellows, either separately or collectively, with the bellows in intercommunication, it has been found convenient to connect the bellows with the housing so that the housing and the bellows are pressurized in one operation. For this purpose, a tube 118 is fixed at one end to the housing by a fitting 119 through which it has air communication with the interior of the housing. The other end of tube 118 is connected to a fitting 121 secured to upper plate 43 of the bellows and communicating with the interior thereof. A male fitting 122, threaded into fitting 121 within the bellows, carries a tube 123, the other end of which is attached to a fitting 124 secured to the upper valve housing 67. When the container housing is pressurized, this pressure is communicated through tubes 118 and 123 and thus into the bellows. The anchoring fitting 124 for the inner extremity of tube 123 is located so as to be remote from the oil level in the bellows at various inclinations of the bellows and thus avoid loss of oil.

It will be seen that, due to the rigid connection between the upper plates of the outer and inner bellows, respectively, through conical cup 60, the two diaphragms 53 and 69 are deformed simultaneously under applied loads. The space between the outer and inner diaphragms constitutes, in the main, an air chamber for the cushioning of ordinary, light loads and also serves as a reservoir for oil. If the inner bellows is filled with oil at the time of application of such light loads, the light spring 99 of the upper valve will yield and pass oil outwardly in an amount corresponding to the deflection of the top plate of the inner bellows.

This oil passes through the openings 109 in valve housing 67 and openings 63 in conical cup 60, and ultimately to the sump in bottom closure 77. During return of the bellows top plates to normal position, oil is drawn in around the lower valve disk 91 so that during the entire cycle the inner bellows remains filled with oil.

It will be seen that the bellows system acts, among other things, as a pump and is self-priming, which is an important consideration in the problems relating to air-oil shock absorbers. Thus it is merely necessary to introduce the total required amount of oil into the bellows as a whole and the pumping action, after a few cycles of deformation of the bellows, will accomplish filling of the oil chamber. If the oil should gradually leak out of the inner chamber during a long period of inactivity of the bellows, as in storage, subsequent handling of the container will result in refilling, due to this pumping action.

The behavior of the system under light loads was discussed above. If a heavy load is suddenly applied, the disk 97 will quickly overcome the light spring 99 and proceed to contact the head 101 of bolt 102. If the total load applied to the bellows as a whole is less than the total load applied to heavy spring 107 in pre-stressing, the disk 97 will not move beyond the position of contact with bolt head 101 and the cushioning characteristics between a load capable of establishing such contact and a load capable of overcoming the heavier spring will depart from those of an air spring alone and partake of the characteristics of an oil spring with an outlet orifice of fixed area. If the applied load exceeds the value necessary to overcome the heavy spring, the cushioning is modified by the characteristics of the heavy spring itself, and the upward movement of the disk 97 increases the valve opening with a resultant softening of the cushioning due to increased rate of outflow of oil. In the deflection of heavy spring 107, sleeve 106 moves through opening 113 in housing 67 and nut 112 moves upwardly away from the housing. The lower valve 91 functions only as an inlet valve and has no relation to the cushioning qualities of the bellows system.

The suspension system for the engine to be stored comprises a sling for the trunnions of the engine and an upper sling for a support bracket on the engine, longitudinally spaced from the trunnions.

As seen in Fig. 4 and in enlarged detail in Fig. 7, the trunnions are supported from saddle members, each comprising a pair of brackets 126 welded to the beveled side 12 of leg 11 of the T-ring, and located intermediate the horizontal and vertical planes through the center line of the housing. Attached to bracket 126 by a plurality of bolts 127 is a suspension member 128, the connection being rendered resilient by rubber bushings 129 surrounding bolts 127. A block 131 secured to a trunnion 132 of the engine as by a bolt 133 is secured to a horizontal shoulder 134 on the suspension member 128 by two bolts 136.

The upper suspension (Fig. 10) indicated as a whole by the numeral 137, comprises a cross-bar 138 having an upper, arcuate surface 139 adapted to mate, at least for a part of its length, with the inner surface of the housing. The cross-bar 138 is provided at its ends with T-slots 141, running laterally across the bar and adapted to engage complementally shaped T-nuts 142 threadedly carried on bolts 143 inserted through the housing wall from the exterior thereof. By this means the cross-bar may be drawn up against the interior wall of the housing and the areas of these attachments are reinforced by straps 144 and a pair of arcuate tubular elements 145, 146, the latter being welded to the housing and the straps having upwardly turned ends 147 welded to the inner sides of elements 146. Since the housing is intended to be pressurized, bolts 143 are provided with resilient washers 148 beneath the usual metal washer 149, an annular seat being provided in strap 144 to accommodate the resilient washer.

The intermediate suspension element (see also Fig. 11) comprises a pair of plates 151 generally triangular in form, which are secured to cross-bar 138 by a plurality of bolts 152 with rubber bushings 153 snugly received in transverse bores in cross-bar 138. The lower extremities of plates 151 are bent inwardly around a stiffening plate 154, and have external, welded reinforcing plates 155. Plates 151 and 155 support a bolt 156 on which a U-shaped element 157 is pivoted, bolt 156 being provided with rubber washers 158 and metal washers 159. U-shaped element 157 carries a bolt 160 adapted to engage a pair of lugs 161 on the upper part of an engine. Bolts 156 and 160 thus constitute a gimbal mounting, and the entire load is cushioned by rubber bushings 153. It should be noted that in the employment of bushings, such as 153, in plurality, it becomes a matter of simple design to take care of engines of various weights since the rubber parts can be standard, and only the bar carrying the bushings need be varied to accommodate more or less of such bushings. The same is true, of course, in regard to the trunnion suspension discussed before.

In mounting an engine, such as that shown at 165, in broken lines, Fig. 2, the blocks 131 are bolted to the engine trunnions, and then to the suspension member 128 depending from the T-ring, which has been preliminarily secured in correct angular relation on housing section 1 by a pair of diametrically disposed brackets 162 (Fig. 4), welded to the arm 11 of the T-ring (Fig. 6), the brackets being secured in any convenient manner to housing section 1, as by bolts 163 welded to the latter. Thereafter, housing section 2 is drawn over the engine to bring upper suspension cross-bar 138 into engagement with T-nuts 142. For this purpose, a guiding rail is provided on the upper interior surface of housing section 2. The rail is of I-section and comprises a pair of channel bars 164, 166 arranged back-to-back, welded to the housing, and extending longitudinally thereof. A rider bar 167 of C-section is secured in a central, lateral channel 168 in cross-bar 138 by means of bolts 169, bar 167 having an attached plate 171 for increasing its effective thickness to threadedly receive bolts 169. The bar 167 is of a length to extend somewhat beyond each side of cross-bar 138 (Fig. 2) and its inwardly turned flanges 172, 173 are adapted to slide on the bottom flanges of channels 164, 166. It should be noted that when the container section 2 is being slid toward section 1 with the rail and rider bar flanges engaged, the cross-bar 138 is somewhat lower relative to housing section 2 than the position shown in Fig. 10. T-nuts 142, therefore, will be accordingly lower on their bolts so as to be aligned with the T-slots of the cross-bar. This registry may be further ensured by a pair of rods 174, 175 anchored to a block 176 fixed to channel rails 164, 166, and connected, respectively, to the two T-nuts. After the housing sections 1, 2 have been brought into abutting relation at the T-ring, the T-nuts are drawn up by turning their bolt heads from the outside of the housing and assume the carrying of the load, C-bar 167 being lifted out of contact with the guiding rail.

End dome 3 of the housing has an opening to receive an accessory container indicated as a whole by the numeral 177. Such a container has been described in my aforesaid co-pending application and need not be further described here in detail. It is sufficient to point out that it is adapted to store documents, such as engine records, will contain a desiccant, and may be pressurized to the same or a different degree from that of the housing interior.

In order to cushion the shock in the event that the container is tipped over sidewise, bumpers are provided on the housing. These, indicated generally by the numeral 178, are attached to the side of the housing below the horizontal plane through the axis of the housing. As shown, they are four in number, two on each side of the housing, and each comprises a bumper rail 179 of square section metal tubing secured to the housing in spaced relation thereto by means of a pair of brackets. Each bracket comprises an arcuate saddle member 180 of shallow, channel section, secured, in nested relation, to adjacent reinforcing bands 23 of the housing as by bolts 181, nuts being welded to the interior of bands 23 to receive the bolts. An outer element 182 of the bracket is joined to the saddle member 180 by upper and lower bridges 183, 184, respectively, of rubber or equivalent material having suitable shock-absorbing qualities, the rubber bridges being bonded to each of the bracket elements and forming the sole connections therebetween. The outer bracket element 182 is of channel section, the depth of the channel increasing in the downward direction of the element so that although its inner part curves inwardly, the outer edges, in the lower half of the member, are substantially vertical so as to present a broadside in contacting the floor or ground. Near its lower end, portions 187 of each side of element 182 are bent inwardly and welded in abutting relation to form a niche snugly receiving the end of bumper rail 179 which is secured in place as by a bolt 188.

It will be seen that the rail 179 and the outer bracket channels define a considerable area for impact so as to avoid concentrated loads, and further that the loads are cushioned by the rubber bridge pieces, backed up by the reinforcing rings on the housing.

A further reduction in the severity of side falls is achieved by providing a rocker 189 beneath each bumper rail. Conveniently, these rockers may be secured to the bellows guards 42. During an overturn of the container, the first fulcrum is along the bottom of the outer side of one of the skids. The first action is a rise of the center of gravity of the total mass of container and contents until it is vertically above the fulcrum line. Movement beyond this position will result in falling of the container due to its own weight. However, it will not behave as a freely falling body since it is constrained to turn in an arc about the fulcrum line and also because, in the early stages of fall, portions of the total mass are still being lifted to their maximum vertical position. In order to determine the energy values at points of impact it is simple and convenient to employ the equivalent free fall of the body. Thus, if the body be turned about its center of gravity, without any motion of translation, until the center of gravity is directly above the point of impact for which the equivalent free fall is to be determined, the equivalent free fall will be simply the distance from the impact point to the floor. In Fig. 4, the fulcrum point is indicated at A, and the first point of impact at B. If radial lines D and E be drawn through points A and B, respectively, from the center of gravity CG, and the arc F drawn through point A and intersecting radial line E at G, the distance BG will represent the distance of equivalent free fall for impact of the point B. This is true even though the situation wherein the floor is perpendicular to the line E at contact of B is not realized in the actual rolling fall, for in computing energy values it is sufficient to consider only the limiting values of the energy levels. In other words, if it be assumed that no obstructions hindered the free fall to G of the point B, any subsequent turning about B as a fulcrum (to the position assumed in the actual rolling fall where the rocker 189 lies along the floor) will not add to the energy spent at point B.

Similarly, in the second stage of rolling fall from point B to point C on bumper 178, the second quantity of energy developed is given by an equivalent free fall through a radial distance CH, where H is the intersection of the radial line I through C with an arc J drawn from B. This energy is dissipated largely in the bumper, but also in the engine suspension, and the initial impact at B is absorbed largely by lateral deformation of the bellows. The two-stage cushioned impact is very effective in minimizing the shock of the tumbling fall.

In order to facilitate handling of the container by fork-lifting trucks, flat-bottomed contact elements 191 are secured, in spaced relation, on the underside of the housing, transversely thereof. Each of these has its ends bent upwardly as at 192 and flanged in arcuate form as at 193 for attachment to the housing as by welding. Guide rails 194 for the truck forks, one of which latter is shown in broken lines at 195 in Fig. 5, are provided along the inner edges of contact elements 191, being also secured to the housing as by welding directly thereto and to brace elements 200.

In the process of enclosure and assembly, the trunnion mounting brackets 126 with suspension members 128, are attached to the inside of the T-ring 8, and the T-ring is secured in approximate position on the rim of container section 1 by means of brackets 162 and bolts 163. The upper suspension 137 is secured to lugs 161 on the engine 165, trunion blocks 131 are secured to the trunnions 132, and the engine is suspended from an overhead lift by means of a sling. The engine is then moved into housing section 1 and the trunnion blocks secured to the suspending members 128. Thereafter, the section 2 of the housing is moved toward housing section 1 and the rails 164, 166 are inserted in and moved along the C-section bar 167 until the T-nuts 142 are engaged in T-slots 141. The housing sections are then secured in abutted relation on the T-ring 8 by means of lugs 16, 17, and the bolts 143 are tightened up to take over the load at the upper suspension 137. The housing and bellows are then pressurized through a valve 196 in the accessory case cover 177.

Conveniently, a series of rubber elements 197 will be carried on the underside of guide rails 194 to contact the skids 33 and avoid undue loading of the bellows prior to pressurizing the same.

An alternative form of bellows is shown in Fig. 14 wherein the important differences have to do with the location of the inner diaphragm and the valve arrangement. Parts identical with those in the Fig. 12 bellows are indicated by similar reference characters. The top plate 198 of the inner diaphragm 69 is bolted in direct contact with the underside of top plate 43 of the outer diaphragm 53. Base plate 199 of the inner diaphragm is secured by bolts 201 to a coupling ring 202 having recesses 203 in its upper surface to permit passage of fluid between the lower chamber within bottom closure 204 and the space between the diaphragms.

The lower plate 199 has a central opening in which is secured a valve, indicated generally by the numeral 205. The valve comprises a cap piece 206 and a downwardly extending sleeve 207 which terminates near the bottom of closure 204. The cap piece has a series of ports 208 communicating with the interior of inner diaphragm 69, and has a central, slant-walled bore in which is secured the head 209 of a bolt 211. A spider 212, threaded on the lower end of bolt 211, engages the lower end of a helical spring 213 securing the latter in abutting relation with an inner annular shoulder 214 on the cap 206. The upper edge of the spring extends somewhat inwardly of the shoulder 214 and is engageable by the outer flange 216 of a valve 217 slidably mounted on the bolt 211 and constantly urged downwardly by a relatively light helical spring 218.

Assuming the inner chamber to be filled with oil, a load on the system of sufficient magnitude to overcome the heavy spring 213 will cause downward movement of valve 217 and oil will be forced out of the inner chamber and into the sump 204 against the pressure of the air in the outer chamber, and at a velocity determined by the extent of valve opening. Upon relaxation of the load, the air pressure will force valve 217 upward against the pressure of light spring 218 to return the displaced oil to the inner chamber. Thus, the action is reciprocal as contrasted with that of the form of bellows of Fig. 12 wherein the flow is circulatory.

The reciprocal flow bellows may be rendered self-priming by provision of a vent which will relieve air-lock in the inner chamber. Thus, a conduit 219 is secured to the top plate 198, as by a bolted strap 221, so that its open end is located at a high level in the oil chamber. A check valve 222 is located in the upper end of conduit 219 and is urged in a direction outwardly of the conduit by a light spring 223, so that fluid motion upwardly through the conduit is prevented. Conduit 219 communicates with a central bore 224 in bolt 211, and a second conduit 225 communicates with the lower end of bore 224 and leads outwardly of the valve sleeve 207 as at 226.

If the inner chamber is not filled with oil, contraction of the bellows as a whole will increase the air pressure within and, due to the lower cubic content of the inner bellows as compared with the combined air chamber and sump, air will pass check valve 222 and proceed through conduit 219, bore 224, and conduit 225—226, where it escapes into the oil and rises to the air chamber. Upon expansion of the bellows, oil is drawn past valve 217 to replace the expelled air. Upon repeated contraction and expansion of the bellows, the oil chamber ultimately becomes filled and the system is then in condition for high dynamic loading.

During low values of dynamic loading, the shocks are cushioned by the air chamber and by passage of oil through the relatively restricted bore 224 in the valve bolt. At high loads, the heavy spring 213 is overcome and oil is forced out of the inner reservoir to gradually dissipate the shock, the effective opening at the valve 217 depending upon the magnitude of the load.

In comparing the two types of bellows shown, it is to be noted that in the Fig. 14 modification the oil chamber is at the same level as the air chamber in order that the oil chamber may have large capacity and, therefore, be capable of handling heavier loads. However, this requires a larger bottom sump and, therefore, the bottom closure 204 is larger in this form. Also, in order to retain communication between the valve and the oil in the sump, the valve sleeve must extend downwardly considerably. While self-priming is possible with such a scavenging device as the valved conduit 219, the oil flow is reciprocal. Considering the bellows of Fig. 12, on the other hand, space consideration in the engine container as a whole may require the smaller sump 77. This entails a lowering of the cubic content of the oil chamber and it therefore can be located at a lower level near the bottom of the sump, enabling simplification of the valve system. As a result, self-priming is possible by a simple check valve and circulatory flow may be had. In systems of the sort considered, the circulatory flow feature is of no little importance due to the time intervals entering into the dynamic loading, which may be of the order of 1/10 or even 1/100 of a second. In intervals of such magnitude, reciprocal flow is relatively sluggish as compared with circulatory flow.

While certain preferred embodiments of the invention have been shown, it will be understood that the invention is not limited thereby, since changes in the size, shape, and location, for instance, of the various parts may be resorted to without departing from the spirit or scope of the appended claims.

What is claimed is:

1. A container for aircraft engines and the like objects, comprising a substantially rigid enclosing body having separable sections to allow for insertion of a said object, a ring connector for said sections, resilient suspension means on said ring connector, a second resilient suspension means adapted for securement within one of said sections, ground-engaging skid means, and shock-absorbing elements carried on the ground-engaging means and attached to the said body.

2. A container for aircraft engines and the like objects, comprising a substantially rigid enclosing body having separable parts to allow for insertion of a said object, resilient suspension means for an object within said body, ground-engaging skid means, shock-absorbing means, including an air chamber, carried on said ground-engaging means and attached to said body, a conduit leading from the interior of said body to said air chamber to communicate pressure therebetween, and valve means for applying pressure to the system including the said body and the said air chamber.

3. A container for aircraft engines and the like objects, comprising a substantially rigid enclosing body having separable parts to allow for insertion of a said object, suspension means for an object within said body, ground-engaging skid means, and shock-absorbing means carried on said ground-engaging means and attached to said body, said shock-absorbing means comprising an outer resilient diaphragm defining an air chamber, an inner resilient diaphragm defining an oil chamber, valve means openable against an applied pressure to permit flow of oil from said oil chamber to said air chamber and arranged for relatively free flow of oil from said air chamber to said oil chamber.

4. The device of claim 3, said valve means comprising a spring-pressed check valve in the upper part of said oil chamber, and a spring-pressed check valve in the lower part of said chamber, the spring pressure on the lower valve being low relatively to that on the upper valve.

5. The device of claim 3, said valve means being located entirely on the lower part of said oil chamber, and conduit providing fluid connection between the oil chamber and the lower part of the air chamber exteriorly of the valve means.

6. The device of claim 3, said valve means comprising a check valve in the upper part of said oil chamber, openable outwardly thereof against two successive and distinct spring pressures, and a check valve in the lower part of said oil chamber openable inwardly thereof against a spring pressure which is light in relation to the spring pressure defining the opening value for said upper valve.

7. A container for aircraft engines and the like, comprising a substantially rigid enclosing body of separable, abutted sections joined by a coupling member, suspending units depending from said member on one side only of a diameter thereof, and each comprising elements connected through a plurality of identical, rubber-bushed pins, and a suspending unit depending from one of said sections and also comprising elements connected through a plurality of rubber-bushed pins.

8. A device as in claim 7, said second-mentioned suspending unit comprising a bar having undercut slots in its upper surface, support means complementarily engageable in said slots, and means on said one of said sections engageable with said support means to draw said bar into contact with the inner wall of said one of said sections.

9. A device as in claim 7, said second-mentioned suspending unit comprising a gimbal connection.

10. A container for aircraft engines and the like, comprising a substantially rigid enclosing body of separable sections, shouldered support elements extending into one of said sections, a suspending element having undercut grooves in which said shouldered elements are, respectively, receivable, a track on the inner wall of said one of said sections, and a rider element on said suspending element, receivable on said track to guide said slots to interengagement with said shouldered elements.

11. In a device as in claim 10, means exteriorly of the container associated with said shouldered elements and adapted to draw the same toward the inner wall of said one of said sections.

12. A container for aircraft engines and the like, comprising a substantially rigid enclosing body, resilient suspension means for mounting an object within the body, ground-engaging skid means, and shock absorbers carried between said body and skid means to cushion and dampen the transmission of forces from said skid means to said body, said shock absorbers comprising a liquid-filled bellows, a valve adapted to open and release liquid from said bellows when said bellows is compressed between said skid means and said body, a light spring and a heavy spring adapted to operate successively to resist the opening movement of said valve whereby said light spring dampens out vibrations of light force and amplitude, and said heavy spring takes the force of heavy impacts.

13. A container according to claim 12 in which said liquid-filled bellows is enclosed within a larger bellows partially filled with gas under pressure and partially filled with oil.

14. A container according to claim 13 in which said smaller bellows has a check valve submerged in the oil contained in said bellows whereby said gas under pressure returns oil to said smaller bellows through said check valve.

References Cited in the file of this patent

UNITED STATES PATENTS

| Number | Name | Date |
|---|---|---|
| 363,378 | Fay | May 24, 1887 |
| 1,169,625 | Dryer | Jan. 25, 1916 |
| 1,226,420 | Uribe | May 15, 1917 |
| 1,365,110 | Kramer | Jan. 11, 1921 |
| 1,468,869 | Reichstetter, Jr., et al. | Sept. 25, 1923 |
| 1,615,812 | Romine | Jan. 25, 1927 |
| 1,727,609 | Kramer | Sept. 10, 1929 |
| 2,194,459 | Frank | Mar. 26, 1940 |
| 2,225,242 | Van Dorn et al. | Dec. 17, 1940 |
| 2,271,260 | Horsley | Jan. 27, 1942 |
| 2,351,427 | Henshaw | June 13, 1944 |
| 2,356,093 | Sampietro et al. | Aug. 15, 1944 |
| 2,469,156 | Corgill | May 3, 1949 |
| 2,494,170 | Goldfield et al. | Jan. 10, 1950 |
| 2,549,906 | Johansson | Apr. 24, 1951 |
| 2,549,907 | Johansson | Apr. 24, 1951 |
| 2,594,586 | Ries | Apr. 29, 1952 |

FOREIGN PATENTS

| Number | Country | Date |
|---|---|---|
| 221,007 | Great Britain | Sept. 1, 1924 |
| 307,154 | Great Britain | Mar. 7, 1929 |
| 849,261 | France | Nov. 17, 1939 |